(12) United States Patent
Thadikaran et al.

(10) Patent No.: US 9,027,148 B2
(45) Date of Patent: May 5, 2015

(54) ANTI-MALWARE PROTECTION OPERATION WITH INSTRUCTION INCLUDED IN AN OPERAND

(75) Inventors: Paul Thadikaran, Rancho Cordova, CA (US); Nicholas D. Triantafillou, Portland, OR (US); Paritosh Saxena, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 148 days.

(21) Appl. No.: 13/995,132

(22) PCT Filed: Mar. 19, 2012

(86) PCT No.: PCT/US2012/029656
§ 371 (c)(1),
(2), (4) Date: Jun. 17, 2013

(87) PCT Pub. No.: WO2013/141838
PCT Pub. Date: Sep. 26, 2013

(65) Prior Publication Data
US 2013/0340088 A1    Dec. 19, 2013

(51) Int. Cl.
*G06F 7/04*     (2006.01)
*G06F 21/62*    (2013.01)
*G06F 13/14*    (2006.01)
*G06F 9/30*     (2006.01)
(Continued)

(52) U.S. Cl.
CPC ............... *G06F 21/62* (2013.01); *G06F 13/14* (2013.01); *G06F 9/30178* (2013.01); *G06F 21/56* (2013.01); *G06F 21/606* (2013.01); *G06F 21/80* (2013.01); *G06F 2221/2107* (2013.01)

(58) Field of Classification Search
CPC ......... G06F 21/60; G06F 21/10; G06F 21/62; G06F 2221/2107; G06F 21/105; G06F 21/606; G06F 21/121; G06F 21/6218; G06F 21/00; G06F 21/12
See application file for complete search history.

(56) References Cited

U.S. PATENT DOCUMENTS 7,647,636 B2 *   1/2010   Polyakov et al. ................ 726/24
7,818,617 B2 *  10/2010   Shen et al. ....................... 714/15
(Continued)

OTHER PUBLICATIONS

International Search Report and Written Opinion mailed Sep. 27, 2012 for International Application No. PCT/US2012/029656, 9 pages.
(Continued)

*Primary Examiner* — Fikremariam A Yalew
(74) *Attorney, Agent, or Firm* — Schwabe, Williamson & Wyatt, P.C.

(57) ABSTRACT

Disclosed is a system and method for extending anti-malware protection to systems having multiple storage devices, such as RAID. In embodiments, a trusted connection may be established between a host and a controller of the multiple storage devices. The trusted connection may use various information encryption techniques to undermine attempts by malware to preserve malware-infected locations on the storage devices by redirecting anti-malware protection related operations by the host. Through an encrypted and trusted connection between the host and a controller of the multiple storage devices, anti-virus and/or anti-malware software (hereinafter, AVS) may transmit encrypted anti-malware protection related operations to the controller of the multiple storage devices, overcoming detection and/or diversion by the malware. Other embodiments may be described and claimed.

23 Claims, 6 Drawing Sheets

(51) Int. Cl.
*G06F 21/56* (2013.01)
*G06F 21/60* (2013.01)
*G06F 21/80* (2013.01)

(56) References Cited

U.S. PATENT DOCUMENTS

| 8,151,352 | B1* | 4/2012 | Novitchi | 726/24 |
| 8,176,280 | B2* | 5/2012 | Farrell et al. | 711/163 |
| 2009/0228262 | A1* | 9/2009 | Farrell et al. | 703/26 |
| 2009/0293126 | A1* | 11/2009 | Archer et al. | 726/24 |
| 2009/0328232 | A1* | 12/2009 | Safford, III | 726/26 |
| 2010/0050261 | A1* | 2/2010 | Park | 726/24 |
| 2010/0275034 | A1* | 10/2010 | Safa | 713/189 |

OTHER PUBLICATIONS

International Preliminary Report on Patentability mailed Oct. 2, 2014 for International Application No. PCT/US2012/029656, 6 pages.

* cited by examiner

ANTI-MALWARE PROTECTION OPERATION WITH INSTRUCTION INCLUDED IN AN OPERAND

CROSS REFERENCE TO RELATED APPLICATIONS

The present application is a national phase entry under 35 U.S.C. §371 of International Application No. PCT/US2012/029656, filed Mar. 19, 2012, entitled "ANTI-MALWARE PROTECTION OPERATION WITH INSTRUCTION INCLUDED IN AN OPERAND", which designated, among the various States, the United States of America. The Specification of the PCT/US2012/029656 Application is hereby incorporated by reference.

TECHNICAL FIELD

The present disclosure relates generally to the technical field of data processing. More specifically, the present disclosure relates to extending anti-malware protection to systems having multiple storage devices, particularly to redundant array independent disk (RAID) systems.

BACKGROUND ART

Malware (or malicious code) is a catch-all term used to refer to various types of software that can cause problems or damage a computer. The term Malware may encompass viruses, worms, Trojan horses, macro viruses, rootkit malware, and backdoors. Over time, malware has evolved to be increasingly more stealthy and targeted.

Malware has become stealthier by, in some cases, hiding inside the core operating system by infecting kernel modules (e.g., rootkits). Rootkits, especially the ones executing with supervisor or high level privileges (e.g., Ring 0 privilege in the case of Intel Architecture processors) are very difficult or nearly impossible to detect by traditional anti-virus solutions or anti-malware solutions (hereinafter, AVS). For example, rootkits with supervisor privilege and other malware hidden therein may intercept queries from the AVS and feed incorrect information to the AVS to preserve the malware in a storage device.

BRIEF DESCRIPTION OF THE DRAWINGS

Embodiments of the invention are illustrated by way of example, and not by way of limitation, in the figures of the accompanying drawings in which like reference numerals refer to similar elements.

DESCRIPTION OF THE EMBODIMENTS

Figure 1:
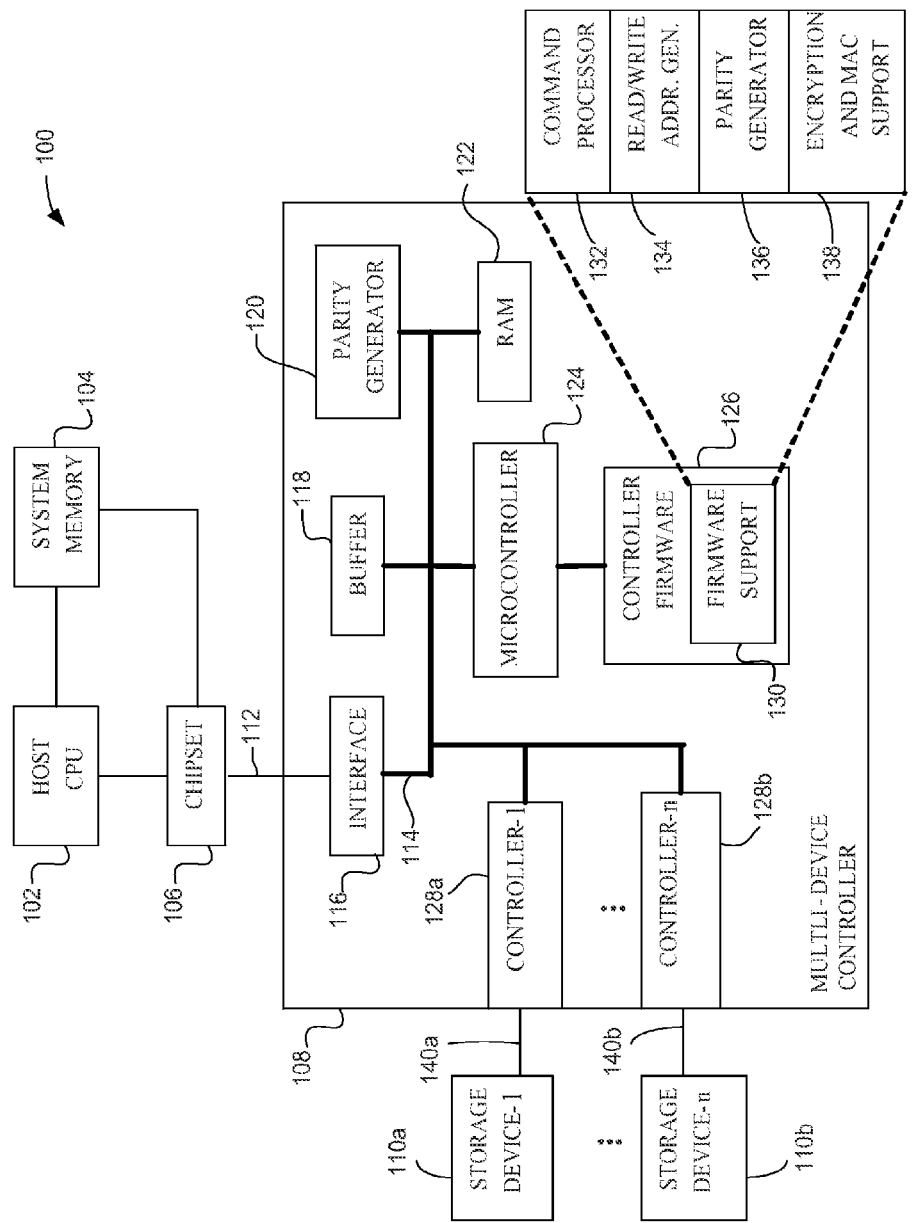
FIG. 1 is a block diagram of a computing device suitable for use to practice various embodiments of the present disclosure.

Embodiments of the present disclosure may relate to extending anti-malware protection to systems having multiple storage devices. In embodiments, a trusted connection may be established between a host and a controller of the multiple storage devices. The trusted connection may use various information encryption techniques to undermine attempts by malware to preserve malware-infected locations on the storage devices by redirecting anti-malware protection related operations by the host. Through an encrypted and trusted connection between the host and a controller of the multiple storage devices, anti-virus and/or anti-malware software (hereinafter, AVS) may transmit encrypted anti-malware protection related operations to the controller of the multiple storage devices, overcoming detection and/or diversion by the malware.

According to one embodiment, the controller may receive from the host device a first instruction having a first address and an operand. The first instruction may be nominally associated with an anti-malware protection related operation, and the first address may refer to first one or more storage locations of the multiple storage devices. Further, the controller may recover from the operand a second instruction that is to be operated on second one or more storage locations of the multiple storage devices. The controller may then execute the second instruction to operate on the second one or more storage locations to effectuate the anti-malware protection related operation.

Various aspects of the illustrative embodiments will be described using terms commonly employed by those skilled in the art to convey the substance of their work to others skilled in the art. However, it will be apparent to those skilled in the art that some alternate embodiments may be practiced using portions of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in one embodiment" is used repeatedly. The phrase generally does not refer to the same embodiment; however, it may. The terms "comprising," "having," and "including" are synonymous, unless the context dictates otherwise. The phrase "A/B" means "A or B". The phrase "A and/or B" means "(A), (B), or (A and B)". The phrase "at least one of A, B and C" means "(A), (B), (C), (A and B), (A and C), (B and C) or (A, B and C)". The phrase "(A) B" means "(B) or (A B)", that is, A is optional.

FIG. 1 illustrates a computing device 100 suitable for practicing embodiments of the present disclosure. As will be described in more detail below, computing device 100 may be configured to be resilient to malware that may be infecting one or more storage devices of computing device 100. As shown, computing device 100 may include a host central processing unit (CPU) 102, system memory 104, a chipset 106, and a multi-device controller 108 coupled to one another.

Multi-device controller 108 may in turn be coupled to one or more storage devices 110a, 110b (collectively 110).

The host CPU 102 may be one or more of a variety of single core or multi-core microprocessors configured to fetch and execute a plurality of instructions. Host CPU 102 may execute e.g., instructions of an operating system configured to facilitate the operation and interconnectivity of the various components of computing device 100. Host CPU 102 may also execute instructions of applications launched by the operating system. According to one embodiment, host CPU 102 is a multi-core processor, such as the Intel® Core i3, Intel® Core i5, and Intel® Core i7 microprocessors, available from Intel® Corporation of Santa Clara, Calif.

The system memory 104 may be communicatively coupled to host CPU 102. System memory 104 may be configured to receive and store instructions executed by host CPU 102, and data associated with the instructions being executed. The system memory 104 may include non-volatile and/or volatile memory. In embodiments, system memory 104 may include one or more of dynamic random access memory (DRAM), synchronous dynamic random access memory (SDRAM), read only memory (ROM), flash memory, and the like.

The chipset 106 may couple signals between system memory 104, a variety of input/output units and host CPU 102. In embodiments, chipset 106 may include a memory controller. In other embodiments, chipset 106 may include a complementary interface to a direct media interface (DMI) integrated with host CPU 102.

The chipset 106 may transmit signals to and receive signals from multi-device controller 108 via communication link 112. The communication link 112 may be any one of a variety of communication interfaces. For example, communication link 112 may be a computer bus interface having a control bus, an address bus, and a data bus, such as, but not limited to, Serial Advance Technology Attachment (SATA), Integrated Development Environment (IDE), peripheral Component Interconnect (PCI), Small Computer System Interface (SCS), HyperTransport™, InfiniBand®, and the like. Alternatively, communication link 112 may be a point to point network connection, such as Ethernet, or may be a wireless connection, such as one conforming with one of the Institute of Electrical Electronic Engineers (IEEE) 802.11 standards.

Still referring to FIG. 1, multi-device controller 108 may be configured to communicate with host CPU 102 via communication link 112 to receive and respond to instructions regarding storage devices 110. In embodiments, multi-device controller 108 may be a card integrated into computing device 100 through a connector that supports communication link 112. According to one embodiment, multi-device controller 108 may be integrated into chipset 106. According to another embodiment, multi-device controller 108 may be a stand-alone device carried by a modular networking rack or cabinet and communicates with chipset 106 via a network connection.

In embodiments, multi-device controller 108 is configured to communicate with host CPU 102 (via chipset 106) through a trusted connection to perform anti-malware related operations. In embodiments, multi-device controller 108 may include a bus 114, an interface controller 116, a buffer 118, a parity generator 120, random access memory (RAM) 122, a microcontroller 124, controller firmware 126, and one or more storage device controllers 128a, 128b (collectively 128), coupled to one another as shown.

The bus 114 may be configured to provide a low resistance connection between several components of multi-device controller 108. The interface controller 116 may be configured to communicatively couple bus 114 to communication link 112 to convert the protocol used on communication link 112 to a protocol that is compatible with the components of multi-device controller 108. The buffer 118 may be coupled to bus 114 and configured to provide temporary storage for microcontroller 124. The parity generator 120 may be coupled to bus 114 and may be configured to support encrypted communications by microcontroller 124 by generating parity data for data handled by microcontroller 124. In embodiments, the parity data may also be stored on one or more storage devices 110. In embodiments, parity generator 120 may be configured to generate dedicated or distributed parity, according to various embodiments of the disclosure. The RAM 122 may be coupled to bus 114 and may be configured to be operable to support microcontroller 124 by storing and providing instructions and their operands, to facilitate sending data to and receiving data from host CPU 102, and to facilitate storing data to and retrieving data from one or more storage devices 110. The RAM 122 may be SRAM, DRAM, SDRAM, or one of any of a variety of types of random access memory, according to several embodiments of the disclosure.

The microcontroller 124 may be communicatively coupled to bus 114 to receive instructions and their operands from host CPU 102 and to transmit instructions and their operands to one or more storage device controllers 128. The microcontroller 124 may be configured to execute instructions and may include one or more of an application specific integrated circuit (ASIC), field programmable gate array (FPGA), and so forth. The microcontroller 124 may be configured to transmit instructions (and their operands, if applicable) to one or more storage device controllers 128 in order to write data to or read data from one or more storage devices 110. The microcontroller 124 may be configured to read from and write data to one or more storage devices 110 in response to instructions received from host CPU 102.

Malware that infects a computer system may alter commands sent from a host CPU to a storage controller. When malware infects the computer system, the malware will often times store malware code and/or data to locations of non-volatile memory or persistent storage of the computer system so that the malware may reinitiate operation upon power up of the computer system after a reset or a power down of the computer system. As discussed previously, some malware may infect the higher privileged portions of an operating system, e.g., the kernel. The malware may then leverage the privileged access to the operating system to redirect attempts by an AVS or other program to read from or write over locations in non-volatile memory or persistent storage that are storing malware code and/or data. For example, an AVS being executed by the computer system may attempt to scan the non-volatile memory or persistent storage in search for patterns that are indicative of malware by reading each location of the memory or a storage device. Deeply rooted malware may intercept attempts by the AVS to read or write certain memory locations by altering the address of the read or write command that is sent to a controller of the non-volatile memory or persistent storage. Thus, without a trusted connection to the controller of the non-volatile memory or persistent storage, eliminating malware with high privileged access may be difficult.

In embodiments, microcontroller 124 may be configured to execute instructions of controller firmware 126 to establish and maintain a trusted connection between multi-device controller 108 and programs, such as an AVS, that are executed by host CPU 102. The controller firmware 126 may be configured to cause microcontroller 125 to perform cryptographic functions. Specifically, controller firmware 126 may include instructions which, when executed by microcontroller 124, enable multi-device controller 108 to establish an out of band connection with an AVS executed by host CPU 102. For example, controller firmware 126 may be configured to cause microcontroller 124 to be responsive to a trusted connection protocol initiated by the AVS. In embodiments, controller firmware 126 may be configured to, in response to receiving a request by the AVS to establish a trusted connection, cause microcontroller 124 to request a signed certificate from the AVS to validate the authorization of the AVS to establish the trusted connection. The controller firmware 126 may include a decryption code, such as a public key to the certificate of the AVS, for decrypting the message received from the AVS. Additionally, controller firmware 126 may include a controller certificate with a private key, so the AVS and multi-device controller 108 utilize a dual level of encryption. These communications between the AVS and multi-device controller 108 may occur concurrently, in parallel, to read/write commands issued to multi-device controller 108 by other programs, such as the operating system, that are executed by the host CPU 102. Thus, a trusted and authenticated connection may be established out of band between multi-device controller 108 and programs that are executed by host CPU 102.

The controller firmware 126 may be configured to support additional cryptographic communications between multi-device controller 108 and programs executed by host CPU 102. According to one embodiment, the AVS may issue read/write commands to multi-device controller 108 using dummy addresses, and the AVS may encrypt the actual read/write addresses in the payload or operand of the command. According one embodiment, the AVS may encrypt the actual read/write addresses in the operand by encrypting the operand with a private key of the certificate of the AVS in addition to using the public key of the certificate of multi-device controller 108. Often times, malware may attempt to redirect commands that are directed to memory/storage locations occupied by the malware. However, since the location addresses associated with these commands are dummy addresses, the malware will likely ignore these commands, since the command do not appear to be directed toward memory locations occupied by the malware. The malware will be unlikely to redirect these commands with addresses that are encrypted in the operand of the command for at least two reasons. First, the malware will be unlikely to redirect the commands because the actual addresses to which the commands are directed are carried in the payload or operand of the command. Second, the malware will be unlikely to redirect the commands because the decryption codes, public keys, private keys, and/or similar technology used to decrypt the encrypted operands, in embodiments, are stored within controller firmware 126. Thus, redirect attempts by the malware will be detectable and reportable when multi-device controller 108 attempts to authenticate commands received from the AVS. While cryptographic techniques associated with public key infrastructure are described herein, in alternate embodiments, controller firmware 126 may be configured to enable multi-device controller 108 to communicate with the programs executed by host CPU 102 by using other cryptographic techniques that are known to those of ordinary skill in the art.

The controller firmware 126 may be configured to perform the above described cryptographic functions by utilizing a firmware support 130. In embodiments, firmware support 130 may include several logical blocks that support cryptographic functions described above. The firmware support 130 may include a command processor 132, a read/write address generator 134, a parity generator 136, and encryption and message authentication code (MAC) support 138. The firmware support 130 may be stored in updatable non-volatile memory, such as flash, according to one embodiment of the disclosure. The encryption and MAC support 138 may be configured to work with command processor 132, read/write address generator 134, and parity generator 136 to cause microcontroller 124 to encrypt and decrypt messages, to validate the authorization of programs executed by host CPU 102, such as AVS, and maintain one or more trusted connections with the programs.

The one or more storage device controllers 128 may be coupled bus 114 and to one or more storage devices 110.

The one or more storage devices 110 may be communicatively coupled to multi-device controller 108 via corresponding communication links 140a, 140b (collectively 140). The one or more storage devices 110 may be one or more hard disk drives (HDD), solid-state drives (SSD), or other non-volatile memory. The one or more storage devices 110 may comprise an array of independent disks that are communicatively coupled to be read from or written to by multi-device controller 108. The communication links 140 collectively may form a small computer system interface (SCSI), an integrated drive electronics (IDE) interface, or other like storage interfaces, according to various embodiments of the disclosure.

In embodiments, one or more storage devices 110 may be configured to store and retrieve data in a striped manner in response to the operation by multi-device controller 108, according to one embodiment. For example, data may be stored onto one or more storage devices 110 in a striped manner without parity, mirroring, or redundancy. As another example, data may be stored onto one or more storage devices 110 in a striped manner with byte-level striping and dedicated parity. As yet another example, data may be stored onto one or more storage devices 110 using one of bit-level, byte-level, and block-level striping and using one of dedicated parity and distributed parity. Consequently, one or more storage devices 110 may be configured to be operated by multi-device controller 108 in a redundant array of inexpensive disks (RAID) configuration in any one or more of standard RAID levels, e.g., RAID levels 0-6.

The AVS may rely on the previously described trusted connection between the AVS and multi-device controller 108 to detect the presence of malware. For example, if the AVS is unable to establish a trusted connection with multi-device controller 108, or if read/write commands are rejected or results in incorrect data. In embodiments, the AVS may provide indication to a display to notify a user that malware may be present on one or more of storage devices 110. Additionally or alternatively, the AVS may transmit an electronic notification to one or more users that malware may be present on one or more storage devices 110, so that correct action may be taken.

Advantageously, inclusion of cryptographic functions within multi-device controller 108 may enable host CPU 102 to establish and maintain a trusted connection between multi-device controller 108 and one or more programs that are executed by host CPU 102. The trusted connection provides anti-malware programs with the ability to scan and correct (e.g., by over-writing) malware that is stored on one or more storage devices 110. The trusted connection provides anti-malware programs with the ability to correct malware, even when the malware has attained high privilege access within computing device 100.

Figure 2:
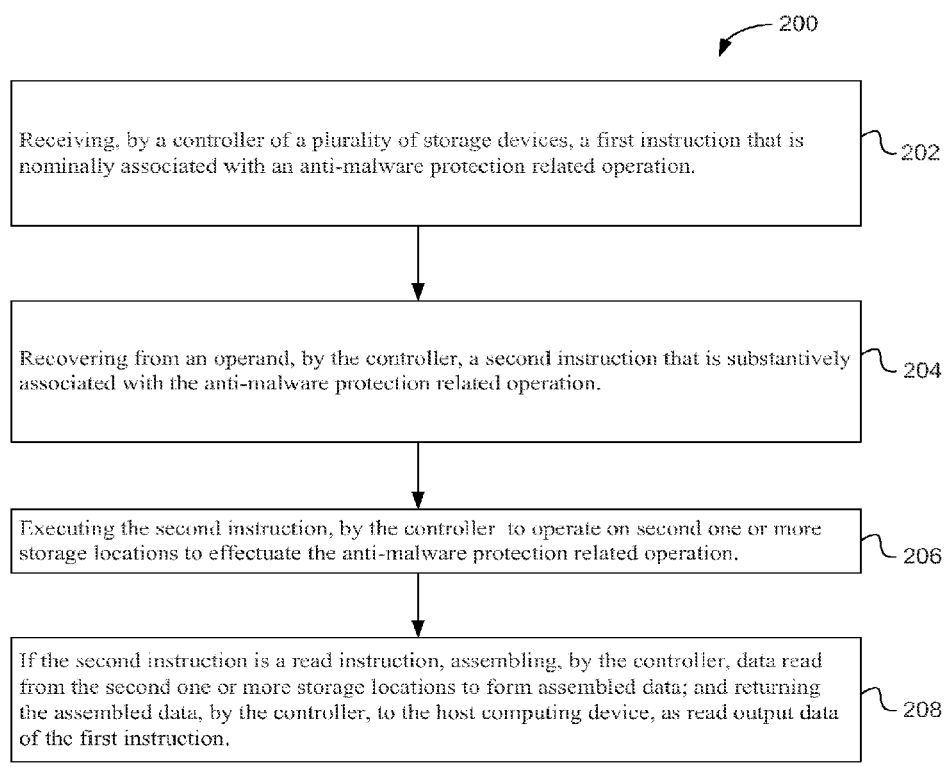
FIG. 2 is a flowchart illustrating operations of various embodiments of the methods of the present disclosure.

FIG. 2 illustrates a method 200 of operating a controller of a plurality of storage devices, such as multi-device controller 108, in accordance with various embodiments. In a block 202, method 200 may include receiving, by a controller of a plurality of storage devices, a first instruction that may be nominally associated with an anti-malware protection related operation (initiated e.g., by an AVS executed by host CPU 102). The controller may receive the first instruction from host CPU 102, which may be coupled to multi-device controller 108. The first instruction may include a first address and an operand. The first address may refer to first one or more storage locations of the storage devices.

As discussed above in connection with FIG. 1, the AVS executed by host CPU 102 may use one or more encryption keys, e.g., a private encryption key of the AVS and a public encryption key of multi-device controller 108, to encrypt the operand of the first instruction.

In block 204, method 200 may include recovering from an operand, by multi-device controller 108, a second instruction. The second instruction may be operated on second one or more storage locations of the number of storage devices. The second instruction may be substantively associated with the anti-malware protection related operation. In embodiments, the first and second one or more storage locations may differ by at least one storage location.

Enabling the controller to recover a second instruction from an operand of the first instruction may prevent malware from detecting the target storage location of the anti-malware protection related operation. According to one embodiment, the second instruction may be encrypted to further prevent malware from detecting the anti-malware protection related operation.

In block 206, method 200 may include executing the second instruction, by multi-device controller 108, to operate on the second one or more storage locations to effectuate the anti-malware protection related operation.

Operating on the second one or more storage locations may include reading the second one or more storage locations in order to search for patterns that are indicative of malware residing at the storage locations. Additionally, operating on the second one or more storage locations may include writing new data to the second one or more storage locations in order to remove malware residing at the storage locations.

In block 208, method 200 may include, if the second instruction is a read instruction, assembling, by multi-device controller 108, data read from the second one or more storage locations to form assembled data; and returning the assembled data, by multi-deice controller 108, to host CPU 102, as read output data of the first instruction.

The method 200 may be fully or partially practiced with computing device 100. For example, computing device 100 may include a computer-readable storage medium embodied with instructions configured to enable multi-device controller 108, in response to execution of the instructions, to perform any or all of the operations of method 200. According to one embodiment, the computer-readable medium may be a non-transitory computer readable storage medium. Furthermore, one or more of the techniques or components described in connection with FIG. 1 may be combined with or used in method 200.

Figure 3:
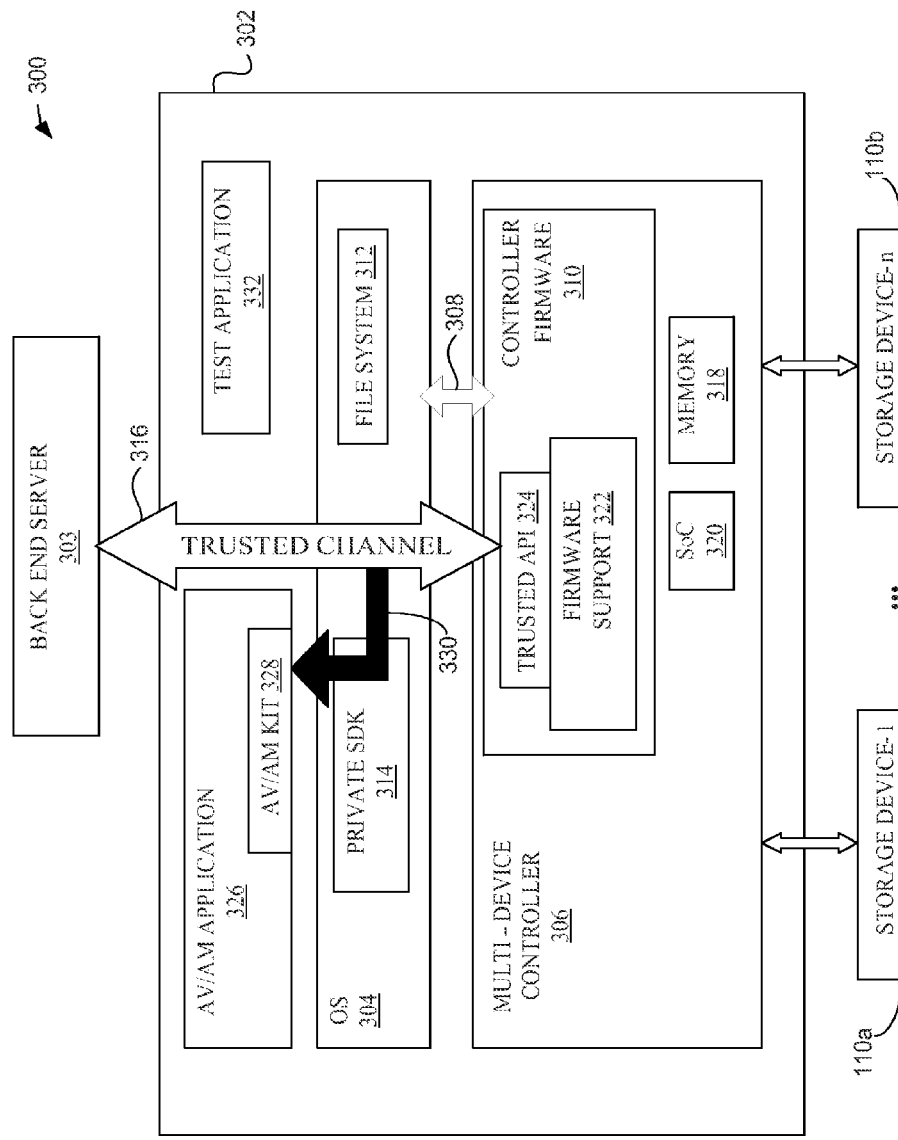
FIG. 3 is a block diagram of a computing arrangement suitable for use to practice various embodiments of the present disclosure.

FIG. 3 illustrates system 300 configured to perform anti-malware related operations, according to various embodiments of the present disclosure. The system 300 may include a host device 302 communicatively coupled to one or more storage devices 110, and a backend server 303.

The host device 302 may include software and hardware to support a trusted connection or out of band secondary channel for performing anti-malware related operations. The host device 302 may include an operating system 304 communicatively coupled to a multi-device controller 306 through a primary channel 308. The primary channel 308 may be any one of a number of standard interfaces used between a host CPU (as shown in FIG. 1) and a storage device controller, e.g., ATA, PCI, Ethernet, and the like. The primary channel 308 represents a physical connection between multi-device controller 306 and hardware running operating system 304. The primary channel 308 also represents a logical connection between operating system 304 and a controller firmware 310.

The operating system 304 may be a Windows product developed by Microsoft Corporation, a UNIX based environment, or a Macintosh related environment such as OS X, according to various embodiments of the disclosure. The operating system 304 may include a file system 312 and a private software development kit (SDK) 314. The file system 312 may be a program operable by operating system 304 that enables a user and operating system 304 to organize and efficiently retrieve data stored on one or more storage devices 110. The private SDK 314 may include a variety of tools that enable the development of software operable by operating system 304.

The multi-device controller 306 may be configured to establish and maintain a secondary and trusted communication channel 316 in addition to maintaining primary communication channel 308. The multi-device controller 306 may include controller firmware 310, memory 318, and a system on a chip 320. According to one embodiment, multi-device controller 306 may be multi-device controller 108 of FIG. 1.

The controller firmware 310 may include cryptographic functionality to support establishing and maintaining a trusted channel with programs and computer systems that are external to host device 302. The controller firmware 310 may include a number of instructions configured to enable multi-device controller 306 to operate on one or more storage devices 110 in response to instructions received from operating system 304, in accordance with standard operation of a storage controller. Additionally, controller firmware 310 may include a number of instructions which, when executed by multi-device controller 306, enable multi-device controller 306 to establish trusted channel 316.

The controller firmware 310 may include firmware support 322 and trusted application programming interface (API) 324, and controller firmware 310 may utilize firmware support 322 and a trusted API 324 to establish a trusted channel 316. Additionally, firmware support 322 may include encryption and message authentication code (MAC) support that may be used by controller firmware 310 to decrypt and authenticate incoming messages. For example, in response to an inquiry or attempt to initiate trusted channel 316 by backend server 303, controller firmware 310 may communicate with backend server 303 through trusted API 324 and firmware support 322 to request a digital certificate, a digital signature, or/and an encrypted message from backend server 303. According to one embodiment, controller firmware 310 may include a PKI-based certificate with a private key for decrypting messages intended to be decoded by multi-device controller 306. The controller firmware 310 may also be pre-loaded with a symmetric or public encryption key that is distributed on a limited basis to enable controller firmware 310 to authenticate backend server 303. Through a series of handshake signals, controller firmware 310 and backend server 303 may establish a trusted channel 316. According to one embodiment, backend server 303 may authenticate and provision or initialize the cryptographic keys and code in controller firmware 310.

According to one embodiment, controller firmware 310 may include instructions which, when executed by multi-device controller 306, cause multi-device controller 306 to execute the operations of method 200 of FIG. 2.

The memory 318 and system-on-a-chip 320 may support multi-device controller 306 in receiving and executing instructions related to storing data to one or more storage devices 110 in a striping manner. For example, multi-device controller 306 may be configured to write data to the one or more storage devices in any one of a bit-level, byte-level, and block-level striping manner, with or without parity.

The host device 302 may include an anti-malware and/or antivirus software (AVS) application 326 that may be executed by the host CPU of host device 302 to perform anti-malware protection related operations. The AVS application 326 may advantageously communicate with multi-device controller 306 through trusted channel 316. The AVS application 326 may use an AVS kit 328 to conform with a protocol recognizable by trusted API 324 of controller firmware 310. Similar to backend server 303, the AVS application 326 may initiate and establish a secondary and trusted communication channel 330 with multi-device controller 306 by encrypting messages that may be decrypted by multi-device controller 306 using cryptographic keys and/or code stored within controller firmware 310.

The AVS application 326 may identify and eliminate malware residing at storage locations of one or more storage devices 110. The AVS application 326 may identify malware by inserting and encrypting read commands and target storage locations of storage devices 110 into the operand of a read or write instruction transmitted to multi-device controller 306. The AVS application 326 compares data that is read from storage locations and identifies malware residing at storage locations by comparing the read data to predetermined patterns. The AVS application 326 may then use an application 332 to notify a user or electronic system that malware has been identified on the storage device. The application 332 may be configured to grant permission to the AVS application 326 to repair, i.e., erase the infected storage locations, or may be configured to instruct the AVS application to await further instruction from a user. Accordingly, system 300 may be used to execute anti-malware protection related operations on a system having one or more storage devices 110.

Figure 4:
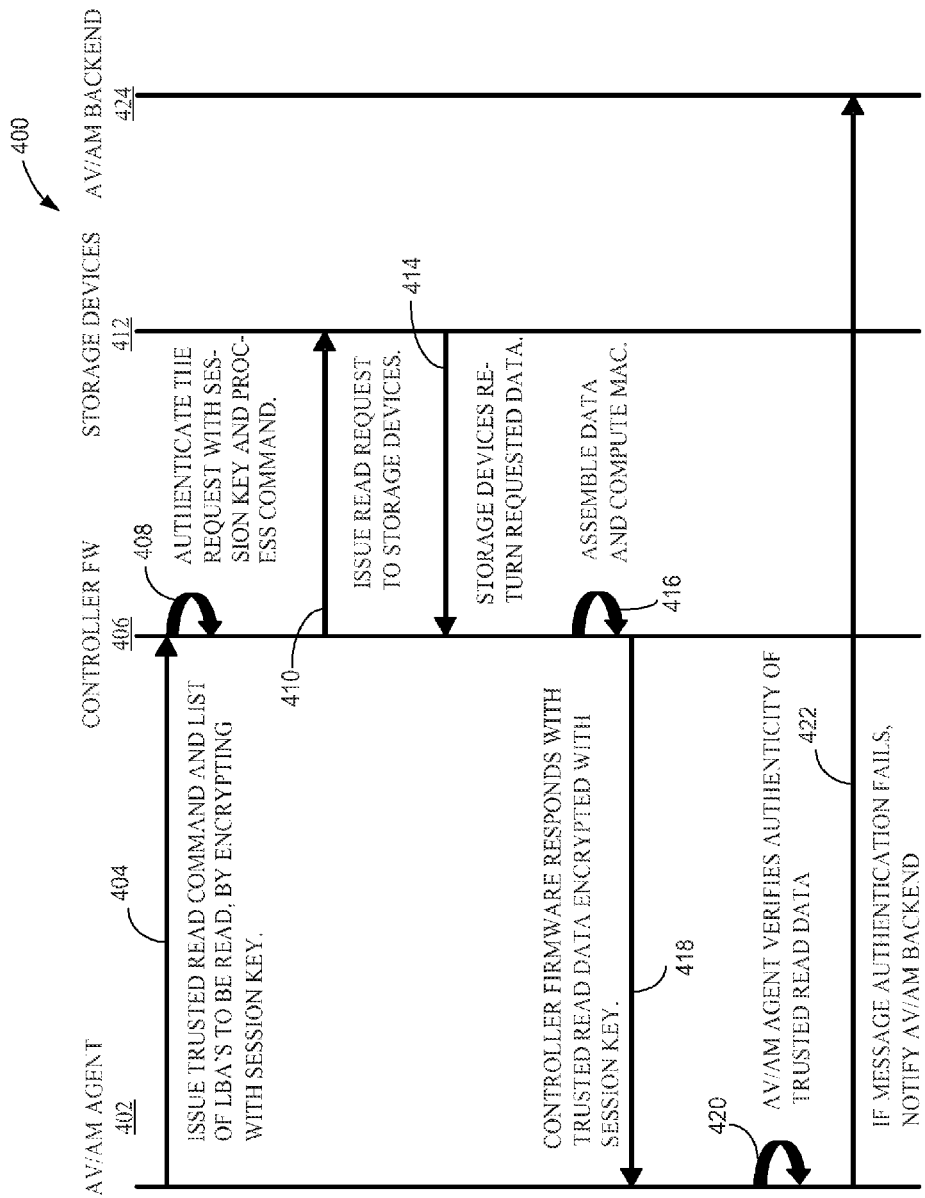
FIG. 4 is a swim lane diagram illustrating a trusted read process according to various embodiments of the present disclosure.

FIG. 4 illustrates a communication sequence 400 for executing a trusted read of a plurality of storage devices, according to one embodiment of the disclosure. At 404, an anti-virus and/or anti-malware (AV/AM) agent 402, such as an AVS program running on either computing device 100 or host device 302, may issue a trusted read command and list of logical block addresses to be read, by encrypting the command the addresses with a session key.

At 408, controller firmware 406 may authenticate the request from the AV/AM agent 402 with a session key located within controller firmware 406, and controller firmware 406 may process the command.

At 410, controller firmware 406 may issue a read request to plurality of storage devices 412 for operation on the logical block addresses requested by AV/AM agent 402.

At 414, storage devices 412 may return data stored at the requested logical block addresses to controller firmware 406.

At 416, controller firmware 406 may assemble read data and compute a message authentication code (MAC). In embodiments, a MAC may be computed by performing a hash function on the read data.

At 418, controller firmware 406 may respond with the trusted read data that has been encrypted with a session key.

At 420, AV/AM agent 402 may verify the authenticity of the trusted read data, for example, by computing a MAC of the decrypted data and comparing the MAC of AV/AM agent 402 to the MAC of controller firmware 406.

At 422, AV/AM agent 402 may notify an AV/AM backend 424 if message authentication fails. The AV/AM backend 424 may then provide notification to one or more users that malware may have prevented a trusted read.

Figure 5:
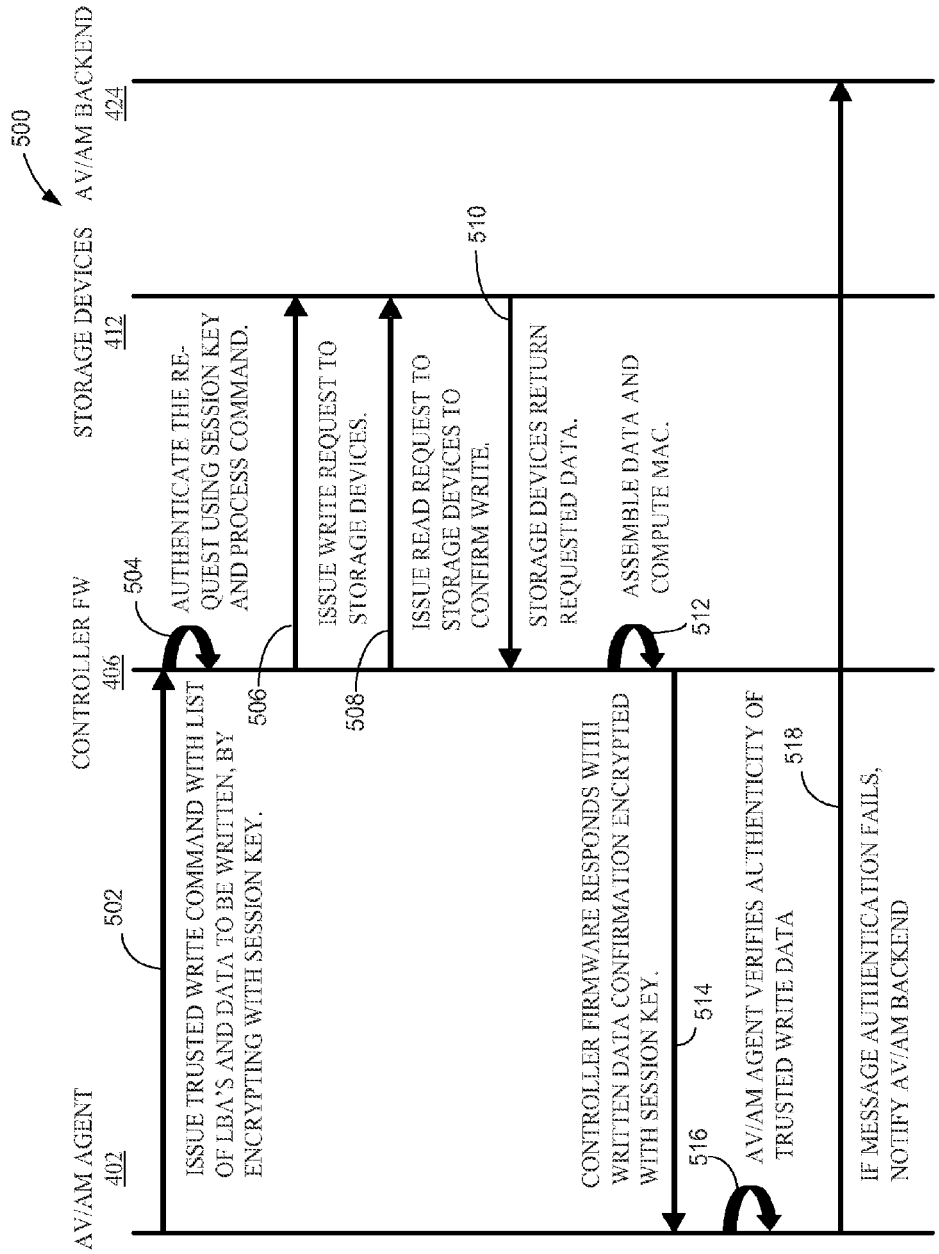
FIG. 5 is a swim lane diagram illustrating a trusted write process according to various embodiments of the present disclosure.

FIG. 5 illustrates a communication sequence 500 for executing a trusted write to logic block addresses of a plurality of storage devices 412, according to one embodiment of the disclosure. At 502, AV/AM agent 402 may issue a trusted write command, data to be written, and a list of logical block addresses operated upon or written to, by encrypting the command the addresses with a session key.

At 504, controller firmware 406 may authenticate the request from AV/AM agent 402 with a session key located within controller firmware 406, and controller firmware 406 may process the command.

At 506, controller firmware 406 may issue a write request to plurality of storage devices 412 of the issued data at the logical block addresses requested by AV/AM agent 402.

At 508, controller firmware 406 may issue a read request to storage devices 412 to confirm that the data was successfully written.

At 510, storage devices 412 may return data stored at the logical block addresses to controller firmware 406.

At 512, controller firmware 406 may assemble the read data and computes a MAC of the data.

At 514, controller firmware 406 may respond to AV/AM agent 402 with the written data confirmation that has been encrypted with a session key.

At 516, AV/AM agent 402 may verify the authenticity of the trusted write data.

At 518, AV/AM agent 402 may notify an AV/AM backend 424 if message authentication fails.

Figure 6:
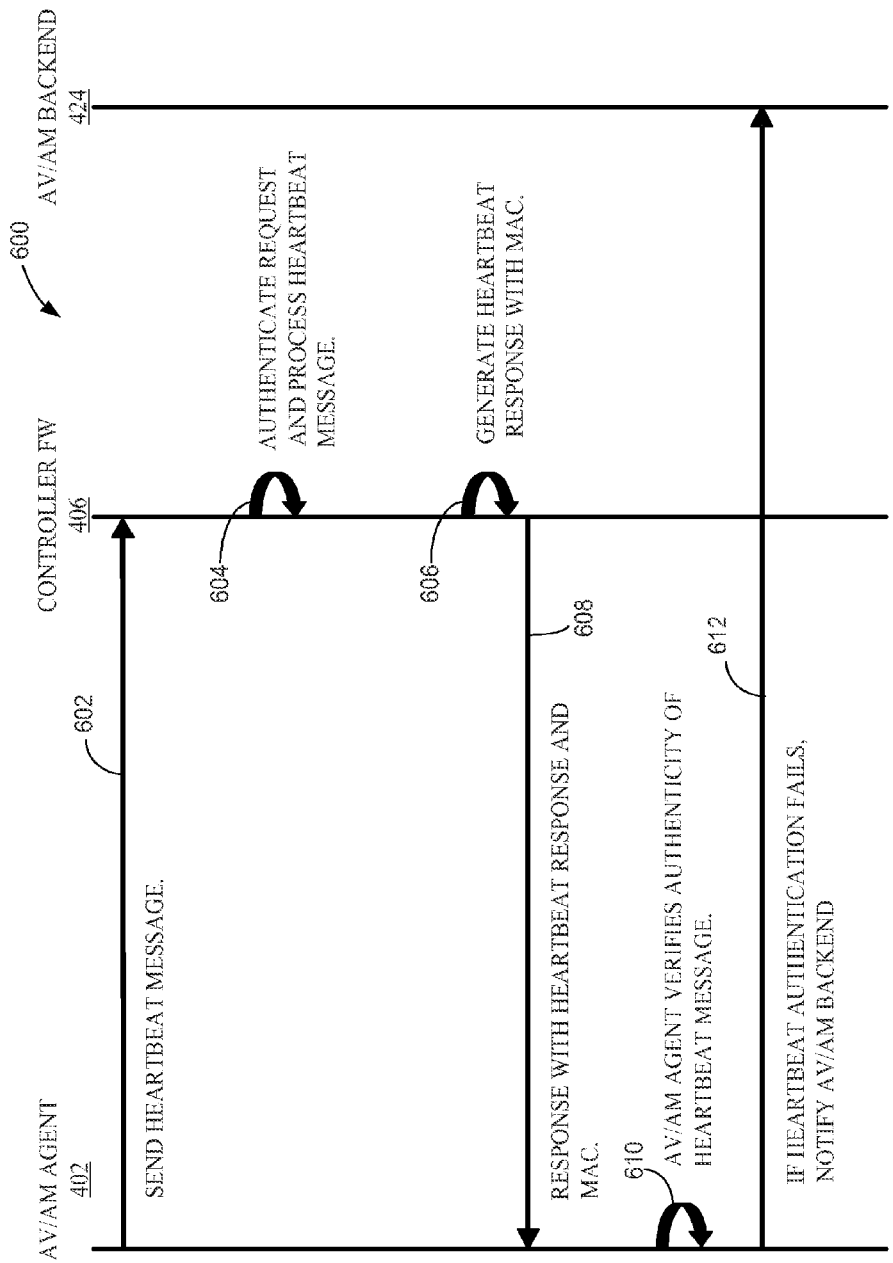
FIG. 6 is a swim lane diagram illustrating maintenance of a trusted channel process according to various embodiments of the present disclosure.

FIG. 6 illustrates a communication sequence 600 for maintaining the trusted connection between AV/AM agent 402 and controller firmware 406. At 602, AV/AM agent may send a heartbeat message to controller firmware 406. The heartbeat message may be an encrypted message including an instruction to acknowledge receipt of the message. The AV/AM agent 402 may encrypt the heartbeat message first with a private key of a public/private belonging to AV/AM agent 402 and then with a public key of a public/private key pair belonging to controller firmware 406.

At 604, controller firmware 406 may authenticate the request from AV/AM agent 402 and processes the heartbeat message. The controller firmware 406 may authenticate the request by decrypting the message first with the private key of controller firmware 406 and second with the public key of AV/AM agent 402.

At 606, controller firmware 406 may generate a heartbeat response with a MAC. The MAC may be computed on the data that was initially encrypted and transmitted by AV/AM agent 402.

At 608, controller firmware 406 may respond with a heartbeat response and the MAC.

At 610, AV/AM agent 402 may verify the authenticity of the heartbeat message. Through actively and periodically maintaining and verifying the trusted connection between AV/AM agent 402 and controller firmware 406, the AV/AM agent may be notified of a new presence of malware if the heartbeat connection unexplainably interfered with.

Some examples of various embodiments are disclosed hereafter.

In various embodiments, at least one computer-readable storage medium may have a number of instructions configured to enable a controller of a number of storage devices, in response to execution of the instructions by the controller, to receive a first instruction from a host computing device coupled with the controller. The first instruction may include a first address and an operand. The first instruction may be nominally associated with an anti-malware protection related operation, and the first address may refer to first one or more storage locations of the storage devices. The controller may also be enabled to recover from the operand, a second instruction that may be operated on second one or more storage locations of the storage devices. The second instruction may be substantively associated with the anti-malware protection related operation, and the first and second one or more storage locations differ by at least one storage location. The controller may be enabled to execute the second instruction to operate on the second one or more storage locations to effectuate the anti-malware protection related operation. The controller may be enabled to receive the first instruction via a trusted connection communicatively coupling the controller and the host computing device. The controller may be enabled to form the trusted connection between the controller and the host computing device over a secondary channel that may couple the controller to the host computing device. The controller and the host computing device may be further coupled to each other via a primary channel.

In other embodiments, the anti-malware protection operation may be one of a read operation and a write operation to be performed on the second one or more storage locations. For a read operation, the controller may be enabled to assemble data read from the second one or more storage locations to form assembled data, and return the assembled data to the host computing device, as read output data of the first instruction.

In other embodiments, the controller to recover the second instruction from the operand may be configured to decode or decrypt the operand based on the instructions.

In other embodiments, the controller may be enabled to use a private key to decode or decrypt the second instruction from the operand.

In other embodiments, the instructions may include a certificate of the controller. The certificate may include the private key. In other embodiments, the controller of the storage devices may be enabled to execute the second instruction to operate on the second one or more storage locations of the storage devices while the storage devices include an array of independent disks.

In various embodiments, data may be stored in a striped manner in the array of independent disks using one of bit-level, byte-level, and block-level striping and using one of dedicated parity and distributed parity. The data may be stored in a striped manner in the array of independent disks with byte-level striping and dedicated parity. The second instruction may be encrypted to prevent malware from detecting the anti-malware protection related operation.

In various embodiments, the controller of the storage devices may be enabled to use a dual layer of encryption.

In embodiments, a method may include receiving, by a controller of a number of storage devices, a first instruction from a host computing device. The host computing device may be coupled to the controller. The first instruction may include a first address and an operand. The first instruction may be nominally associated with an anti-malware protection related operation, and the first address may refer to first one or more storage locations of the storage devices. The method may include recovering from the operand, by the controller, a second instruction to be operated on second one or more storage locations of the storage devices. The second instruction may be substantively associated with the anti-malware protection related operation, and the first and second one or more storage locations may differ by at least one storage location. The method may include executing the second instruction, by the controller, to operate on the second one or more storage locations to effectuate the anti-malware protection related operation.

According to various embodiments, receiving may include receiving the first instruction via a trusted connection communicatively coupling the controller and the host computing device. The method may further include forming, by the controller, the trusted connection between the controller and the host computing device over a secondary channel. The secondary channel may couple the controller to the host computing device. The controller and the host computing device may be further coupled to each other via a primary channel. The operand may be encrypted and recovering the second instruction from the operand may include decrypting the operand by using a private key.

According to various embodiments, the first and second instructions may be read or write instructions. For read instructions, the method may further include assembling, by the controller, data read from the second one or more storage locations to form assembled data, and returning the assembled data, by the controller, to the host computing device, as read output data of the first instruction. The storage devices may include an array of independent disks. The data may be stored in a striped manner in the array of independent disks without parity, mirroring or redundancy. The data may be stored in a striped manner in the array of independent disks with byte-level striping and dedicated parity.

In embodiments, an apparatus may include a number of data storage devices, and at least one controller communicatively coupled to the data storage devices. The at least one controller may be configured to write data to the data storage devices and read data from the data storage devices in response to a first number of instructions. The controller may be configured to receive a first storage instruction that includes a first operand and a first address corresponding to first one or more storage locations. The controller may be configured to recover a second storage instruction based on the first operand. The second storage instruction may include a second address corresponding to second one or more storage locations that differ from the first one or more storage locations by at least one storage location. The controller may be configured to execute the second storage instruction to operate on the second one or more storage locations to effectuate an anti-malware protection related operation.

In various embodiments, the controller may configured to receive the first storage instruction from a host computing device via a trusted logical connection between the controller and the host computing device over a secondary channel. The secondary channel may communicatively couple the controller and the host computing device. The controller and the host computing device may be further coupled to each other via a primary channel.

In various embodiments, the controller may be further configured to be responsive to a first instruction set via the primary channel and a second instruction set via the secondary channel. The second instruction set may include fewer instructions than the first instruction set. The secondary channel may be an out of band channel. The data storage devices may include an array of independent disks. The data may be stored in a striped manner in the array of independent disks using one of bit-level, byte-level, and block-level striping and using one of dedicated parity and distributed parity storage techniques. The controller may include a parity generator configured to support encrypted communications by the controller.

In various embodiments, an apparatus may include a number of data storage devices, and at least one controller communicatively coupled to the data storage devices. The at least one controller may be configured to receive read and write commands encoded with dummy addresses. The at least one controller may be configured to decrypt actual read and write addresses that have been encrypted by a malware protection related program into operands of the respective read and write commands.

In various embodiments, the actual read and write addresses may be encrypted with a public key and the at least one controller may be configured to decrypt the actual read and write addresses with a private key corresponding to the public key.

In various embodiments, the received read and write addresses may have been encrypted with dual levels of encryption and the at least one controller may be configured to decrypt the dual levels of encryption.

Specific features of any of the above described embodiments may be fully or partially combined with one or more other embodiments, either wholly or partially, to form new embodiments of the disclosure.

What is claimed is:

1. At least one non-transitory computer-readable storage medium having a plurality of instructions to enable a controller of a plurality of storage devices, in response to execution of the instructions by the controller, to:
   receive a first instruction from a host computing device coupled with the controller, wherein the first instruction includes a first address and an operand, wherein the first instruction is nominally associated with an anti-malware protection related operation, and the first address refers to first one or more storage locations of the plurality of storage devices;
   recover from the operand, a second instruction to be operated on second one or more storage locations of the plurality of storage devices, wherein the second instruction is substantively associated with the anti-malware protection related operation, and the first and second one or more storage locations differ by at least one storage location; and
   execute the second instruction to operate on the second one or more storage locations to effectuate the anti-malware protection related operation, wherein the anti-malware protection related operation is one of a read operation or a write operation to be performed on the second one or more storage locations, and
   wherein for a read operation the instructions are further to enable the controller to: assemble data read from the second one or more storage locations to form assembled data; and return the assembled data to the host computing device, as read output data of the first instruction, and
   wherein for a write operation the instructions are further to enable the controller to: store data in a striped manner in the second one or more storage locations.

2. The at least one computer-readable medium of claim 1, wherein the controller is enabled to receive the first instruction via a trusted connection communicatively coupling the controller and the host computing device, wherein the instructions are further configured to enable the controller, in response to execution of the instructions, to:
   form the trusted connection between the controller and the host computing device over a secondary channel coupling the controller to the host computing device, and wherein the controller and the host computing device are further coupled to each other via a primary channel.

3. The at least one computer-readable medium of claim 1, wherein the plurality of instructions that are configured to enable the controller to recover the second instruction from the operand are further configured to enable the controller to decode or decrypt the operand based on the instructions.

4. The at least one computer-readable medium of claim 3, wherein the plurality of instructions are configured to enable the controller to use a private key to decode or decrypt the second instruction from the operand.

5. The at least one computer-readable medium of claim 4, wherein the plurality of instructions include a certificate of the controller, wherein the certificate includes the private key.

6. The at least one computer-readable medium of claim 1, wherein the plurality of storage devices comprise an array of independent disks.

7. The at least one computer-readable medium of claim 6, wherein data are stored in the striped manner in the array of independent disks using one of bit-level, byte-level, and block-level striping and using one of dedicated parity or distributed parity.

8. The at least one computer-readable medium of claim 1, wherein the second instruction is encrypted to prevent malware from detecting the anti-malware protection related operation.

9. A method, comprising:
   receiving, by a controller of a plurality of storage devices, a first instruction from a host computing device coupled to the controller, wherein the first instruction includes a first address and an operand, wherein the first instruction is nominally associated with an anti-malware protection related operation, and the first address refers to first one or more storage locations of the plurality of storage devices;
   recovering from the operand, by the controller, a second instruction to be operated on second one or more storage locations of the plurality of storage devices, wherein the second instruction is substantively associated with the anti-malware protection related operation, and the first and second one or more storage locations differ by at least one storage location; and executing the second instruction, by the controller, to operate on the second one or more storage locations to effectuate the anti-malware protection related operation, wherein the first and second instructions are read or write instructions, and
   wherein for read instructions, the method further comprises: assembling, by the controller, data read from the second one or more storage locations to form assembled data; and returning the assembled data, by the controller, to the host computing device, as read output data of the first instruction, and
   wherein for write instructions the method further comprises, storing data in a striped manner in the plurality of storage devices.

10. The method of claim 9, wherein receiving comprises receiving the first instruction via a trusted connection communicatively coupling the controller and the host computing device, wherein the method further comprises forming, by the controller, the trusted connection between the controller and the host computing device over a secondary channel coupling the controller to the host computing device, and wherein the controller and the host computing device are further coupled to each other via a primary channel.

11. The method of claim 9, wherein the operand is encrypted and recovering the second instruction from the operand includes decrypting the operand by using a private key.

12. The method of claim 9, wherein data are stored in a striped manner in an array of independent disks without parity, mirroring or redundancy.

13. The method of claim 9 wherein data are stored in a striped manner in an array of independent disks with byte-level striping and dedicated parity.

14. An apparatus, comprising:
a plurality of data storage devices; and,
wherein the controller is to:
receive a first storage instruction, the first storage instruction including a first operand and a first address corresponding to first one or more storage locations of the plurality of storage devices,
recover a second storage instruction based on the first operand, the second storage instruction including a second address corresponding to second one or more storage locations of the plurality of storage devices that differ from the first one or more storage locations by at least one storage location, and
execute the second storage instruction to operate on the second one or more storage locations to effectuate an anti-malware protection related operation, wherein the anti-malware protection related operation is one of a read operation or a write operation to be performed on the second one or more storage locations, and
wherein for a read operation the controller is further to:
assemble data read from the second one or more storage locations to form assembled data; and return the assembled data to the host computing device, as read output data of the first instruction, and
wherein for a write operation the controller is further to:
store data in a striped manner in the second one or more storage locations.

15. The apparatus of claim 14, wherein the controller is configured to receive the first storage instruction from a host computing device via a trusted logical connection between the controller and the host computing device over a secondary channel communicatively coupling the controller and the host computing device, wherein the controller and the host computing device are further coupled to each other via a primary channel.

16. The apparatus of claim 14, wherein the controller is further configured to be responsive to a first instruction set via the primary channel and a second instruction set via the secondary channel, wherein the second instruction set includes fewer instructions than the first instruction set.

17. The apparatus of claim 14, wherein the secondary channel is an out of band channel.

18. The apparatus of claim 14, wherein the plurality of data storage devices comprise an array of independent disks.

19. The apparatus of claim 18, wherein data are stored in a striped manner in the array of independent disks using one of bit-level, byte-level, or block-level striping and using one of dedicated parity or distributed parity storage techniques.

20. The apparatus of claim 14, wherein the controller comprises a parity generator configured to support encrypted communications by the controller.

21. An apparatus, comprising:
a plurality of data storage devices; and
at least one controller communicatively coupled to the plurality of data storage devices and configured to:
receive read and write commands encoded with false read and write addresses; and
decrypt actual read and write addresses that have been encrypted by a malware protection related program into operands of the respective read and write commands,
wherein for a read command the controller is further to:
assemble data read from the actual read and write addresses to form assembled data; and return the assembled data as read output data of the read command, and
wherein for a write command the controller is further to:
store data in a striped manner in the actual read and write addresses.

22. The apparatus of claim 21, wherein the actual read and write addresses are encrypted with a public key and the at least one controller is configured to decrypt the actual read and write addresses with a private key corresponding to the public key.

23. The apparatus of claim 22, wherein the received read and write addresses have been encrypted with dual levels of encryption and the at least one controller is configured to decrypt the dual levels of encryption.

* * * * *